United States Patent [19]
Hurayt et al.

[11] Patent Number: 5,687,651
[45] Date of Patent: Nov. 18, 1997

[54] TABLE AND STORAGE COMPARTMENT FOR A TRUCK CAB

[75] Inventors: Mark S. Hurayt, Aloha; Joachim Paschke, Portland, both of Oreg.

[73] Assignee: Freightliner Corporation, Portland, Oreg.

[21] Appl. No.: 642,399

[22] Filed: May 3, 1996

[51] Int. Cl.$^6$ .................................................. A47B 37/00
[52] U.S. Cl. ................... 108/44; 297/188.01; 312/282
[58] Field of Search ................. 108/44, 143; 220/756, 220/761; 296/37.8; 224/277, 400, 275; 297/135, 188.01, 232, 188.19, 188.18; 312/282

[56] References Cited

U.S. PATENT DOCUMENTS

| | | | |
|---|---|---|---|
| D. 153,348 | 4/1949 | Gainsbro | 108/44 X |
| 1,207,332 | 12/1916 | Selman | 224/543 X |
| 1,653,579 | 12/1927 | Marko | 220/756 X |
| 2,184,047 | 12/1939 | King | 108/134 X |
| 2,351,610 | 6/1944 | Hamberg | 312/282 X |
| 2,585,742 | 2/1952 | Condon | 108/134 X |
| 4,508,038 | 4/1985 | Tulenko, Jr. | 297/135 X |
| 4,512,503 | 4/1985 | Gioso | 296/37.8 X |
| 4,796,791 | 1/1989 | Goss et al. | 108/44 X |

*Primary Examiner*—James R. Brittain
*Assistant Examiner*—Janet M. Wilkens

[57] ABSTRACT

A combination table and storage unit for use in a truck cab having a base, a substantially planar table, a table storage receptacle coupled to the base providing a sleeve for receiving the table, and a table support. The table support is positionable against one side of the table to allow it to be placed conveniently in the sleeve, yet when needed for support is swung to a position at a substantial angle relative to the table. The unit further includes a removable storage unit which may be releasably attached to the base with defined compartments therein for holding materials needed by the truck operator.

14 Claims, 3 Drawing Sheets

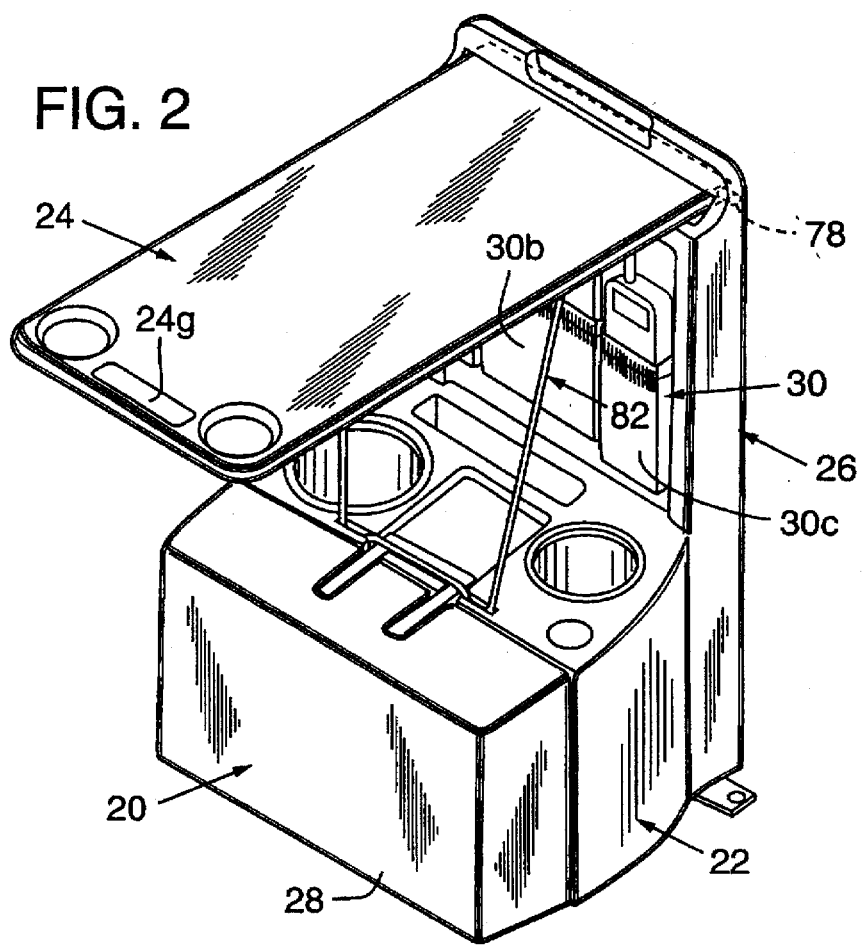
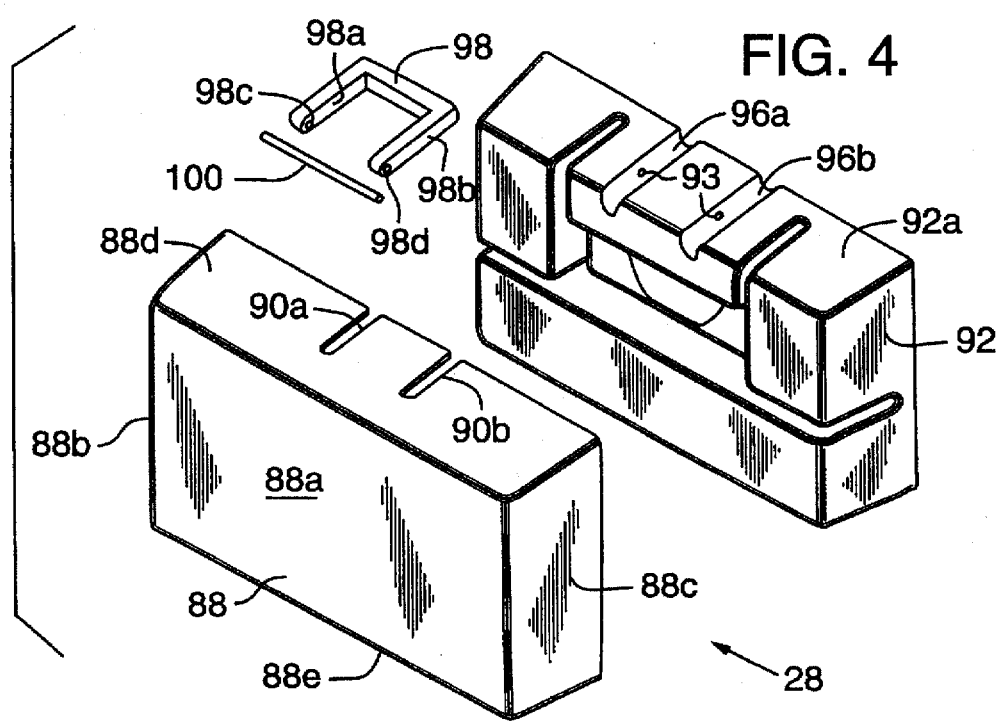

TABLE AND STORAGE COMPARTMENT FOR A TRUCK CAB

FIELD OF THE INVENTION

This invention relates to a combination table and storage unit for use in the cab of a truck.

BACKGROUND OF THE INVENTION

Truck operators often have need for a table and storage regions for work and convenience items. An appropriate location for a table and storage would be in the cab of the truck adjacent the operator's position.

A primary object of the present invention is to provide a combination table and storage unit for the cab of a truck which may be conveniently positioned for use by the operator.

More specifically, an object of the present invention is to provide a combination table and storage unit in which an elongate substantially planar table may be received in a substantially upright sleeve for compact storage, and may be taken therefrom and supported in a substantially horizontal position for use.

Another object of the invention is to provide a novel table and storage unit which has a base with storage compartments in which the operator may keep needed items conveniently stored near at hand.

Yet another object of the present invention is to provide a novel unit for a truck cab in which a removable storage compartment is provided connected to a base. The storage compartment may have a handle which serves a dual purpose for carrying and also for connecting to the base.

More specifically, an object of the invention is to provide such a unit in which a releasable interconnection is provided between the base and removable storage compartment.

These and other objects and advantages of the present invention will become apparent as the following description is read in conjunction with the drawings.

BRIEF DESCRIPTION OF THE DRAWINGS

FIG. 2 is a perspective view of the unit with the table slid out of the sleeve and supported substantially horizontal for use;

FIG. 4 is an exploded view of a removable storage compartment illustrating an outer shell and inner liner construction therefore.

DESCRIPTION OF PREFERRED EMBODIMENT OF THE INVENTION

Figure 1:
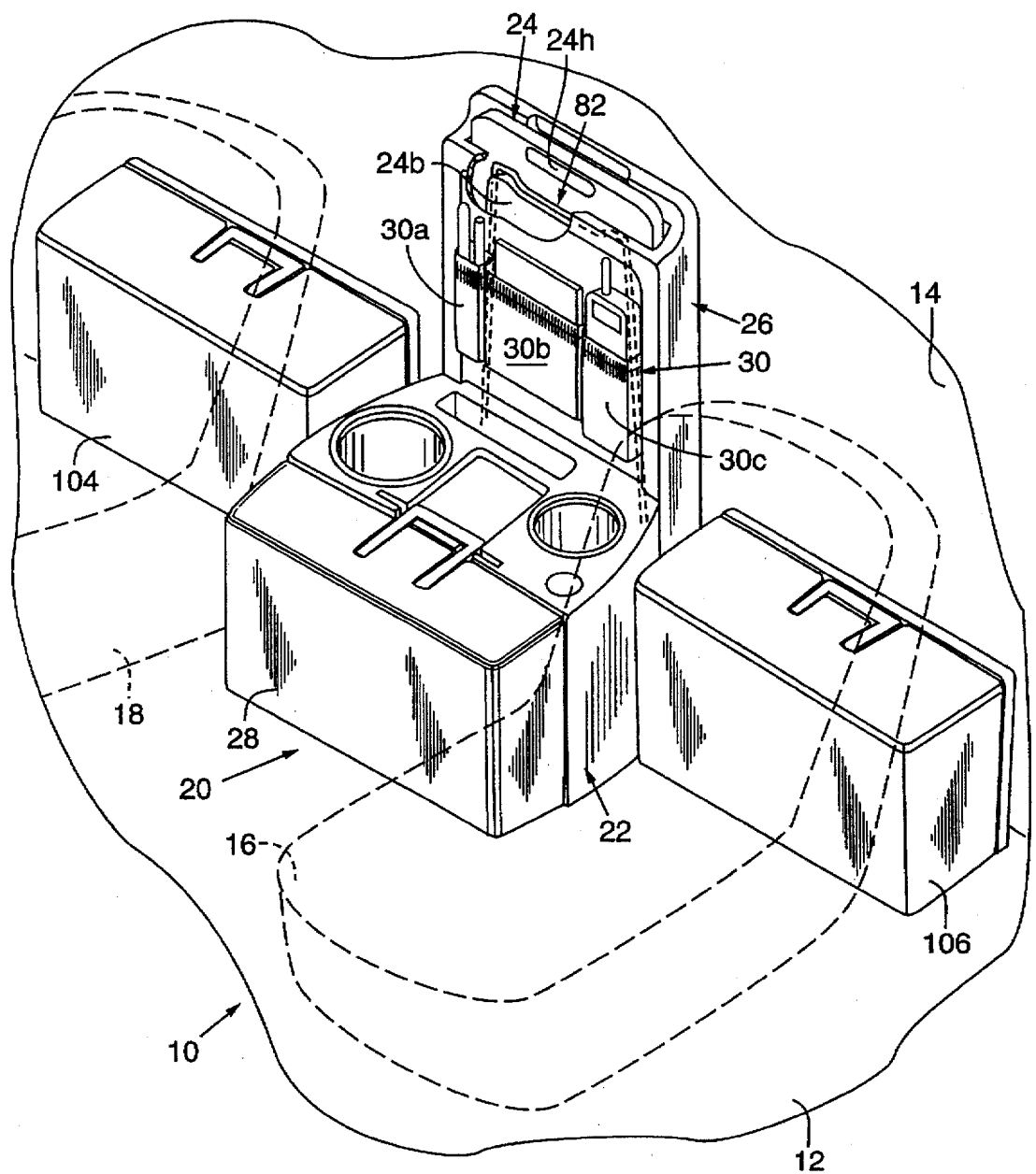
FIG. 1 is a perspective view of a table and storage units constructed according to an embodiment of the invention positioned in the cab of a truck, with the table stowed substantially vertically in a receiving sleeve, and a portion of the sleeve partially broken away for illustrative purposes.

Referring to the drawings, and first, more specifically to FIG. 1, at 10 is indicated generally a portion of the cab of a truck having a horizontal floor 12 and an upright back panel, or wall, 14. A pair of laterally spaced driver and passenger seats 16, 18 are illustrated in dashed outline only, with an open space therebetween.

A combination table and storage compartment unit, constructed according to an embodiment of the present invention, is indicated generally at 20. The unit includes a base 22, a table 24, a table storage receptacle, or sleeve, 26 and a removable storage compartment 28. Each of these will be described in greater detail below.

Figure 3:
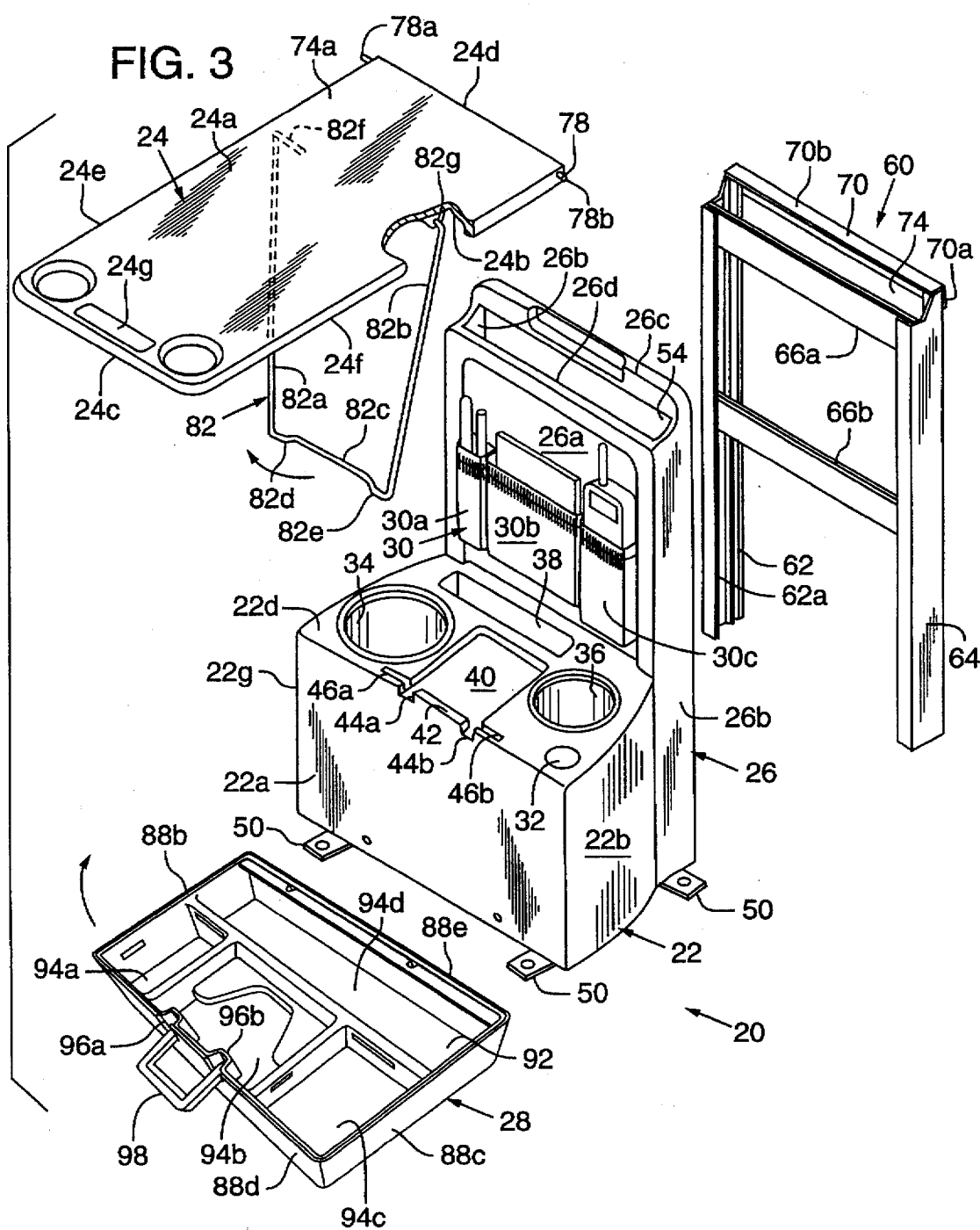
FIG. 3 is a somewhat exploded view of an embodiment of the invention showing discrete elements of the unit.

Referring to FIG. 3, base 22 has a front wall 22a, opposed end walls 22b, and a top 22d. Four open top wells, 32, 34, 36, 38, are formed in the base. Wells 32, 34, 36 are substantially cylindrical in shape and adapted to hold a variety of items which a truck driver may need. For example, well 32 may receive a flashlight in upright position, well 36 may hold a cylindrical beverage container, and well 34 may hold paper toweling or toilet tissue. Well 38 is substantially rectangular in form and could be used to hold notebooks, manuals, note pads, etc.

Top 22d is formed with a substantially rectangular central depression 40 bounded at the top of face 22a by an upwardly extending projection 42. A pair of laterally disposed channels 44a, 44b open past opposite sides of projection 42. A pair of aligned grooves 46a, 46b are formed in top 22d and extend outwardly from depression 40 near and parallel to front wall 22a.

Substantially upright table storage receptacle, or sleeve, 26 is coupled to the rear of base 22. A plurality of horizontally disposed tabs 50 extend laterally outwardly from the bottom of base 22 and storage receptacle 26 permitting the unit to be secured, by appropriate fasteners, to floor 12 of the truck.

Referring to table storage receptacle, or sleeve, 26, it is a formed upright element having a substantially vertical front face, or panel, 26a, and a pair of opposed upright sides 26b. The top is formed by a cross piece 26c. The underside of cross piece 26c is spaced slightly above and rearwardly of the horizontal top surface 26d of the front panel. The space provided between the cross piece 26c and the top surface 26d is slightly greater than the thickness of table 24, as will be explained below. This produces a substantially rectangular opening 54 at the top of sleeve 26 to accommodate table 24.

A pouch unit 30, having three formed pouches 30a, 30b, 30c is coupled to front panel 26a for holding added equipment the operator may want close at hand. For example pouch 30a may hold pens and pencils, pouch 30b a book, and pouch 30c a portable telephone. The pouch unit may be formed as a unitary part of sleeve 26, or may be an add-on feature such as a leather or vinyl unit attached to the sleeve.

A frame structure 60 illustrated in FIG. 3 includes a pair of channel shaped upright side members 62, 64. Each of these has a vertically disposed channel, or groove, such as that shown at 62a formed on its inner surface and extending longitudinally therealong. A pair of horizontally disposed cross members 66a, 66b extend between and are secured, as by welding, at their opposite ends to side members 62, 64 to interconnect such and provide a substantially rigid frame. An elongate angle member 70 extends between the top edges of side members 62, 64. The substantially upright leg 70a of the angle member is secured to the vertical rear surfaces of side members 62, 64 and its horizontally disposed top leg, or portion, 70b extends between the top ends of the side members 62, 64. The top ends of side members 62, 64 are stepped, such that the underside of top portion 70b of angle member 70 and the top edge of cross member 66a are spaced apart a distance similar to the distance between the bottom of cross member 26c and the top of front panel 26d to form an opening 74 therebetween.

When the unit is assembled, as illustrated in FIGS. 1 and 2, the frame structure 60 is received and secured in sleeve structure 26, with openings 54, 74 coinciding.

Referring to table 24, it is an elongate substantially planar member having a planar top 24a, a bottom surface 24b, opposed end margins 24c, 24d, and opposed longitudinal edges, or sides, 24e, 24f. Finger grip depressions 24g, 24h are formed in the opposed top and bottom surfaces 24a, 24b, respectively.

An elongate cylindrical rod 78 extends transversely through table 24 adjacent rear end 24d and has opposite end portions 78a, 78b extending outwardly from opposite edges 24e, 24f of the table.

A formed wire table leg, or support, 82 is pivotally connected to table 24. The support has a pair of laterally disposed elongate leg portions 82a, 82b which are joined by a cross piece 82c. A central portion of cross piece 82c is offset from end portions 82d, 82e thereof as illustrated in FIG. 3. The purpose for these offset sections will be described below.

In-turned end portions 82f, 82g of leg 82 are pivotally received in bores formed on the underside of table 24 so that the support leg is pivotable between the extended, or support, position illustrated in FIG. 3, projecting at a substantial angle relative to the plane of the table, and a stowed or parallel position as illustrated in FIG. 1 resting against the underside 24b of the table. The underside 24b has a depression formed therein to receive support leg 82 to accommodate sliding of the sleeve into storage receptacle 26, as will be described below.

In assembled condition, the table fits within the space between side members 62, 64 of frame 60 in the storage receptacle with ends 78a, 78b of rod 78 received in the channels on the inner sides of side members 62, 64. With the wire support leg 82 folded flat against the underside of table 24, the table may slide vertically in the storage receptacle and frame 60 and be guided therein by ends 78a, 78b of the rod riding in the channels of side members 62, 64. The openings 54, 74 in the storage receptacle and frame permit the table to be slid vertically upwardly and out of the storage receptacle. After a major portion of the table has exited the opening of the receptacle, it may be swung to a horizontal position, as illustrated in FIGS. 2 and 3. In this position, the rear edge margin of the table adjacent rear end 24d is prevented from totally exiting the storage receptacle by cross member 26c and angle member 70. After the table is extended outwardly from the storage receptacle, support leg 82 may be swung downwardly to the position illustrated in FIGS. 2 and 3, with portions 82d, 82e inserted in grooves 46a, 46b to support the table in a substantially horizontal position. Thus, a useful table is provided between seats 16, 18 in the truck cab when needed, and it may be conveniently stowed in the storage receptacle 26 at other times.

Referring to FIGS. 3 and 4, the storage compartment 28 is illustrated in greater detail. The storage compartment includes an outer shell 88 having a substantially planar face panel 88a, opposed end panels 88b, 88c, and opposed upper and lower edge panels 88d, 88e. A pair of laterally spaced channels 90a, 90b extend inwardly from the edge of upper panel 88d opposite that which joins with face panel 88a.

The side of shell 88 facing away from the viewer in FIG. 4 is open.

A substantially rigid formed liner 92 has a configuration which nests snugly within shell 88 as illustrated in FIG. 3. The liner is formed such that it defines a plurality of discrete compartments 94a, 94b, 94c, 94d within storage compartment 28.

A pair of laterally spaced channels 96a, 96b are formed in the upper side portion 92a of liner 92. Bores, such as those indicated generally at 93, extend through side portions of channels 96a, 96b.

A U-shaped handle 98, having opposed legs 98a, 98b, with bores 98c, 98d formed therein, respectively, is adapted to be received in channels 90a, 90b and grooves 96a, 96b.

With the bored ends of legs 98a, 98b extended through channels 90a, 90b and into grooves 96a, 96b an elongated pivot pin 100 may be extended therethrough and through bores 93, 98c, 98d to pivotally connect the handle to liner 92.

When handle 98 extends outwardly to the position illustrated in FIG. 3, it forms a handle for carrying storage compartment 28. However, when storage compartment 28 is positioned upright and abutted against base 22, as seen in FIGS. 1 and 2, handle 98 may be laid over, and in this position extends laterally outwardly to one side of the storage compartment. In this position, the handle fastens to projection 42 on the base to releasably couple the storage compartment to base 22. The handle and projection thus form interengaging coupling connectors.

When the handle 98 engages projection 42 as illustrated in FIGS. 1 and 2, table 24 still may be supported thereabove, since the central portion 82c of leg 82 rests atop handle 98 and projecting end portions 82d, 82e of the lower end of support 82 project downwardly into grooves 46a, 46b to hold the lower end of the wire-formed table support leg in position.

Two additional storage compartments 104, 106 are illustrated in FIG. 1. Although not illustrated in detail, these also may be similar to the storage unit 28 described above with formed shells and inset liners with hingedly connected handles which engage support units mounted in the cab to provide additional storage space.

Although not shown in detail, a releasable netting, or mesh, material may be connected to and stretched across the open backside of storage compartment 28 to hold materials in the storage compartment when it is removed from base 22.

Describing operation of the unit, the base and upright table storage receptacle are secured to the floor of the cab between Seats 16, 18. The removable storage compartment 28, holding equipment which the operator may wish to have available, such as first aid supplies, tools, etc., is connected to the front side of base 22 for convenient access. It is connected by the handle 98 engaging projection 42 on the base, and is easily removed therefrom merely by swinging the handle upwardly to remove the storage compartment from the base.

The operator may use the open top wells in base 22 to store items, such as a flashlight, beverage container, paper towel products, etc. for easy access.

The table normally is in its vertical stowed position in the table storage receptacle, or sleeve, as illustrated in FIG. 1. It is a simple matter to grip the table adjacent its forward edge 24c and pull it vertically out of sleeve 26 until a major portion of the table has exited the sleeve and then swing it horizontally to the position illustrated in FIGS. 2 and 3. Swinging support leg 82 downwardly and engaging its lower end in grooves 46a, 46b serves to support the table in its substantially horizontal position as illustrated between seats 16, 18. The rear end of the table is supported against vertical movement by the marginal portions of sleeve 26 and frame 60.

When the table is no longer needed, it is a simple matter to swing it upwardly to a vertical position, swing the support leg 82 to a position against the underside of the table, and then slide the table vertically into sleeve 26. The table is guided by opposite ends of rod 78 moving in the tracks provided in side members 62, 64.

In setting up the table when the support leg 82 has fully exited the sleeve it is swung down from the table by gravity. Conversely when the table is inserted into the sleeve the leg is automatically swung back against the underside of the table by engagement with the upper portion of the sleeve surrounding opening 54. Thus setup and stowing of the table are substantially one-handed operations.

While a preferred embodiment of the invention has been described herein, it should be apparent to those skilled in the art that variations are possible without departing from the spirit of the invention.

What is claimed is:

1. A combination table and storage unit for a truck cab comprising:

a base adapted to be mounted on a floor in the cab, said base having at least one storage compartment formed therein, an elongate table, a table storage receptacle coupled to the base and extending upwardly therefrom defining an upright table-receiving sleeve having an open top through which said table may pass into and out of said sleeve and providing a rest for one end of the table, when out of the sleeve, and an elongate substantially rigid table support in operative position extending between the base and the table for supporting said table in a substantially horizontal position over said base when out of said sleeve, said table support comprising an elongate support element pivotally connected adjacent one of its ends to said table for swinging between a first position disposed substantially parallel to said table to permit receipt in said sleeve and a second position extending at a substantial angle relative to the table and substantially vertically to provide support for said table.

2. The combination of claim 1, wherein said base has a top and the top has a receptacle thereon adapted to releasably receive a second end of said support element opposite its said one end.

3. The combination of claim 1, wherein one of said table storage receptacle and table has an elongate track formed therein and the other of said table storage receptacle and table has a guide thereon received slidably in said track to guide movement of said table vertically in said table storage receptacle.

4. The combination of claim 3, wherein a stop element is disposed adjacent the top of said table storage receptacle to inhibit removal of said table fully from said sleeve, while permitting pivoting of the table from an upright position in said sleeve to a horizontal position out of said sleeve.

5. The combination of claim 1, wherein said base has a substantially upright side wall and which further comprises a removable storage compartment contiguous said side wall and coupled to said base.

6. The combination of claim 5, wherein said base and removable storage compartment have inter-engaging coupling connectors for releasably coupling the storage compartment to the side of the base.

7. The combination of claim 5, wherein said removable storage compartment comprises an outer shell and a substantially rigid liner received and held in said shell, said liner being configured to define a plurality of discrete storage regions in said storage compartment.

8. The combination of claim 1, wherein said base compartment has an open-topped well formed therein.

9. The combination of claim 8, wherein said base has plural open-topped wells formed therein, with one well being cylindrical to receive and hold a cylindrical item and another well being rectangular.

10. The combination of claim 1, where said table storage receptacle comprises an outer shell in which an inner frame is mounted, and said inner frame defines a track adapted to guide said table on movement into and out of said table storage receptacle.

11. The combination of claim 1, wherein said base has mounting tabs projecting laterally outwardly from a lower portion thereof through which tabs fasteners may be extended to secure the base to the floor of a truck cab.

12. A combination table and storage unit for a truck cab comprising:

a base adapted to be mounted in the cab, said base having at least one storage compartment formed therein, an elongate table, a table storage receptacle coupled to the base defining an upright table-receiving sleeve havinq an open top through which said table may pass into and out of said sleeve and providing a rest for one end of the table when out of the sleeve, a table support for supporting said table in a substantially horizontal position over said base when out of said sleeve, and a removable storage compartment coupled to said base, said base and removable storage compartment have inter-engaging coupling connectors for releasably coupling the storage compartment to the base, wherein said coupling connectors comprise a handle on said removable storage compartment and a projection on the base over which said handle may be fastened.

13. A storage unit for a truck cab comprising:

a base adapted to be mounted to the floor of the cab having a top and a substantially upright side wall, and a removable storage compartment contiguous said side wall and coupled to the base, said base and storage compartment having inter-engaging coupling connectors for releasably coupling the storage compartment to the base, said coupling connectors comprising a handle on said removable storage compartment and a projection on the top of the base over which the handle may be fastened, said projection extends upwardly from remainder portions of the base, and said handle is pivotally connected to an upper portion of said storage compartment for swinging between a carrying position extending upwardly from the compartment and a connecting position extending substantially horizontally and laterally to one side of the compartment to engage said projection.

14. A storage unit for a truck cab comprising:

a base adapted to be mounted to the floor of the cab, and a removable storage compartment coupled to the base, said base and storage compartment having inter-engaging coupling connectors for releasably coupling the storage compartment to the base, wherein said storage compartment comprises an outer shell and a substantially rigid liner held in said shell, said liner being configured to define a plurality of discrete storage regions in said storage compartment.

* * * * *